US011516538B1

(12) United States Patent
Liu et al.

(10) Patent No.: US 11,516,538 B1
(45) Date of Patent: Nov. 29, 2022

(54) TECHNIQUES FOR DETECTING LOW IMAGE QUALITY

(71) Applicant: Amazon Technologies, Inc., Seattle, WA (US)

(72) Inventors: Zongyi Liu, Redmond, WA (US); Bruce Ferry, Seattle, WA (US); Simon Paul Lacasse, Issaquah, WA (US); Hai Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/036,741

(22) Filed: Sep. 29, 2020

(51) Int. Cl.
*H04N 21/44* (2011.01)
*H04N 21/437* (2011.01)
*G06T 7/00* (2017.01)
*G06K 9/62* (2022.01)
*G06V 20/40* (2022.01)

(52) U.S. Cl.
CPC ..... *H04N 21/44008* (2013.01); *G06K 9/6217* (2013.01); *G06T 7/0002* (2013.01); *G06V 20/46* (2022.01); *H04N 21/437* (2013.01); *G06T 2207/10016* (2013.01); *G06T 2207/10024* (2013.01); *G06T 2207/30168* (2013.01)

(58) Field of Classification Search
CPC .......... H04N 21/44008; H04N 21/437; H04N 21/234363; H04N 21/2662; H04N 19/132; H04N 19/17; H04N 19/59; H04N 19/86; G06K 9/00744; G06K 9/6217; G06T 7/0002; G06T 2207/10016; G06T 2207/10024; G06T 2207/30168; G06T 5/20; G06T 5/009; G06T 7/13; G06T 3/4053; G06N 3/08; G06N 3/088; G06N 3/0454; G06V 20/46
See application file for complete search history.

(56) References Cited

U.S. PATENT DOCUMENTS

| 10,467,729 | B1 * | 11/2019 | Perera | G06T 3/4046 |
| 2018/0247127 | A1 * | 8/2018 | Bovik | G06K 9/00771 |
| 2018/0276797 | A1 * | 9/2018 | Wu | G06T 7/90 |
| 2019/0258902 | A1 * | 8/2019 | Colligan | G06T 7/0002 |
| 2020/0177898 | A1 * | 6/2020 | Park | H04N 19/30 |

* cited by examiner

*Primary Examiner* — Alazar Tilahun
(74) *Attorney, Agent, or Firm* — Kilpatrick Townsend & Stockton LLP

(57) ABSTRACT

Systems and methods are described herein for detecting image impairments indicating low quality images within video content. An image impairment detection (IMD) model can be generated with a training data set including images that include one or more image impairments. Video content comprising a set of video frames may be obtained and a video frame provided to the image impairment detection model as input. Output may be received from the image impairment detection model indicating that the video frame includes an image impairment artifact indicative of a particular image impairment. One or more operations may be executed based at least in part on the output received.

19 Claims, 12 Drawing Sheets

TECHNIQUES FOR DETECTING LOW IMAGE QUALITY

BACKGROUND

Online streaming services have been growing at a fast pace. The quality of the content obtained from a content provider is not always optimal and may include low quality images that have a variety of impairments. Conventional techniques for detecting low image quality tend to utilize i) full reference metrics (e.g., peak signal noise ratio (PSNR), mean square error (MSE)) that require a complete noise-free signal (e.g., master content), and/or ii) reduced-reference metrics that require some samples from the master content. However, a master/original version of the content is not always available to a content streaming provider. Other techniques for detecting low image quality are computationally expensive, time intensive, and/or are inaccurate with respect to detecting low quality images.

BRIEF DESCRIPTION OF THE DRAWINGS

Various embodiments in accordance with the present disclosure will be described with reference to the drawings, in which.

DETAILED DESCRIPTION

Figure 1:
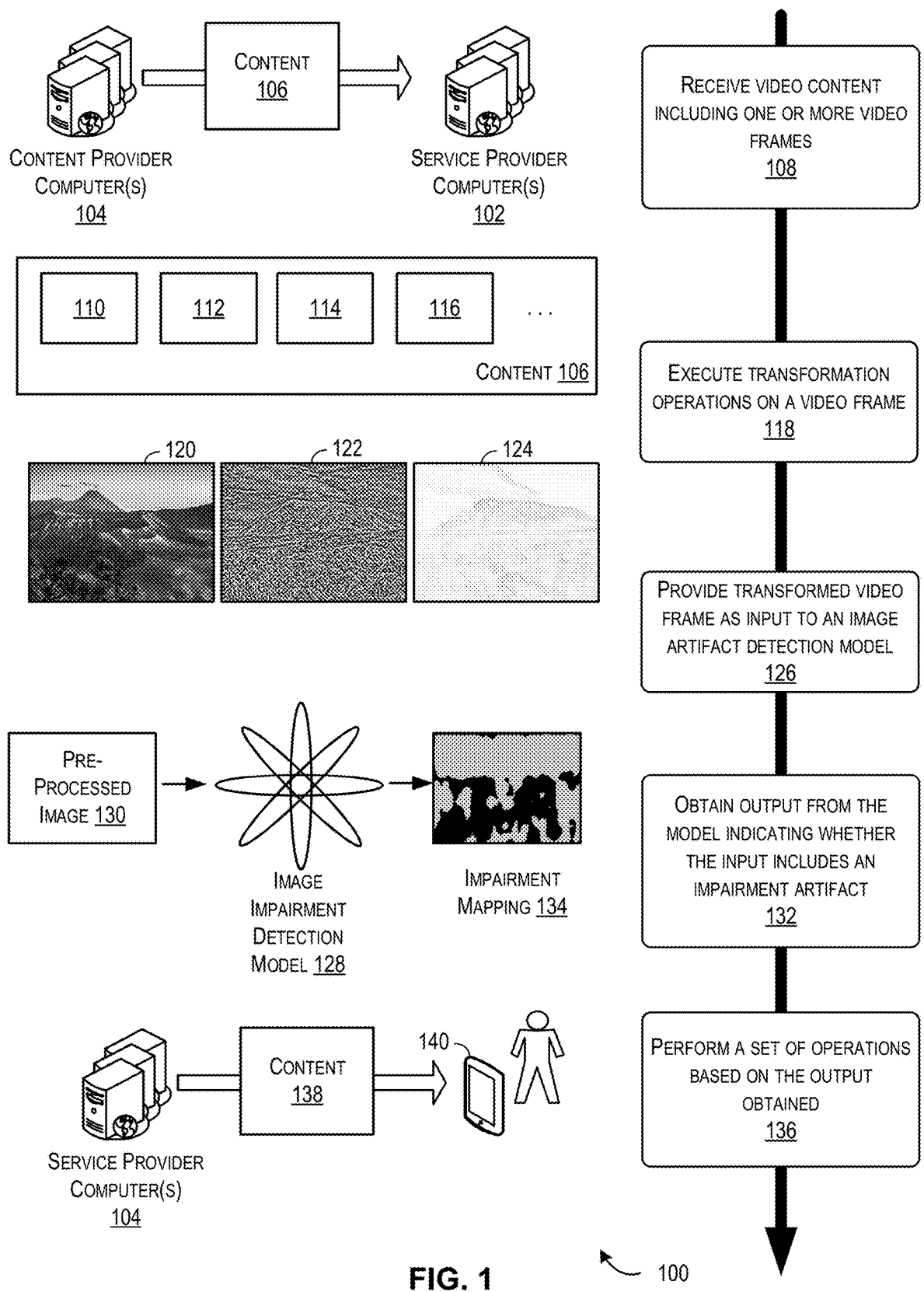
FIG. 1 illustrates a flow for detecting an impairment artifact within video content utilizing an image impairment detection model, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to detecting low quality images within video content utilizing an image impairment detection (IMD) engine. In some embodiments, the image impairment detection engine may utilize a video frame as input to an image impairment detection model.

In some embodiments, the image impairment detection (IMD) model may be trained utilizing supervised learning techniques and a training data set that includes example images that include a particular type of impairment. An impairment, or type of impairment, refers to at least one of an up-scaled image, an interlaced image, an encoding error, and/or a compression error, or any suitable defect of an image that results in an image quality that fails to meet a predefined quality threshold. Some example of these types of impairments are illustrated in FIGS. 2A-2E. In some embodiments, the training data set with which the IMD model is trained may further include examples of images that do not include the particular type of impairment. A single IMD model could be trained to identify one or more impairments within an image provided as input or, in some embodiments, multiple IMD models may be trained to identify a one or more respective impairments using separate training data sets that are provide specific positive (and potentially negative) examples of one or more specific impairments. By way of example, one IMD model may be trained to identify up-scaled images while another IMD model could be trained to identify one or more encoding errors (e.g., H.264 encoding errors, MPEG-2 encoding errors, etc., or any combination of the above).

A service provider computer (e.g., a computer operated by or on behalf of a provider of a streaming service) may obtain video content (e.g., a movie, a television episode, a clip, etc.) to be streamed to a user device. The service provider computer may be configured to perform pre-processing operations to prepare various video frames of the video content to be utilized as input data. By way of example, video frame data (e.g., RGB channel data) may be converted from one color space (e.g., RGB) to another color space (e.g., YUV). In some embodiments, the second color space may separate the intensity and the chrominance components of the video frame data. A mean-subtracted contrast normalization (MSCN) transform may be executed with the converted video frame data to compute MSCN coefficients on local spatial neighborhoods of the video frame such that the distribution of such coefficients may be identified. The transformed video frame data including the distribution of MSCN coefficients may be provided to the IMD model as input. The IMD model may provide an output that indicates whether the video frame includes an impairment that the IMD model was trained to identify. In some embodiments, this output may include a mapping that indicates whether each pixel of the video frame indicates the presence of an impairment. A ratio between pixels that indicate an impairment and pixels that do not indicate an impairment can be calculated, and the video frame can be considered to include the impairment if the ratio meets and/or exceeds a predefined threshold.

In some embodiments, a set of operations may be executed based at least in part on the output and/or determination that the video frame includes/does not include the impairment. By way of example, if the video frame is determined to not include the impairment (and/or any impairment) the video frame can be streamed as requested to the user device. However, if the video frame is determined to include the impairment, the service provider computer may be configured to request alternate content and/or execute one or more algorithms to mitigate the effect of the impairment before streaming the content.

The IMD model may be improved over time utilizing reinforced learning techniques. By way of example, an image which was identified by the IMD model as including or not including a particular impairment may be submitted to a user (e.g., an administrator of the IMD model, a crowdsource system, etc.) to illicit feedback regarding whether or not the user agrees with the IMD model's determination. If the feedback indicates agreement, the image may be added to the training set and utilized to retrain/update the IMD model such that the accuracy of the IMD model with respect to identifying impairments in subsequent input is improved. Thus, disclosed herein are techniques that improve the accuracy and latency of detecting low quality images within video content without requiring access to the master content.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates a flow 100 for detecting an impairment artifact within video content utilizing an image impairment detection model, in accordance with at least one embodiment. The operations of flow 100 may be performed by service provider computer(s) 102. In some embodiments, service provider computer(s) 102 may be configured to provide an online streaming service with which users may request video content to be streamed to their devices. In some embodiments, the service provider computer(s) 102 may be configured to request and obtain the requested video content from content provider computer(s) 104. Content provider computer(s) 104 may be operated by or on behalf of a content provider. These content provider computer(s) 104 may be configured to access master content (e.g., an original version of video content) and perform any suitable format modifications, encoding operations, compression operations, or the like, prior to providing modified content (e.g., content 106) to the service provider computer(s) 102.

The flow 100 may begin at 108, where content 106 (e.g., a movie, a television episode, a clip, etc.) may be received by the service provider computer(s) 102. The content 106 may be received in response to a previous request provided by the service provider computer(s) 102 to the content provider computer(s) 104 requesting the content 106 (e.g., requesting content of a particular format such as standard definition (SD), high definition (HD) and/or content having been encoded and/or compressed with particular codecs). The content 106 may include any suitable number of video frames (e.g., video frames 110-116). The service provider computer(s) 102 may be configured to analyze one or more video frames to identify whether the video frames include one or more impairments (e.g., impairments that indicate a low quality frame).

Figure 2A:
FIGS. 2A-2E illustrate a number of example image impairments, in accordance with at least one embodiment.
Figure 2B:
Figure 2C:
Figure 2D:
Figure 2E:

FIGS. 2A-2E illustrate a number of example image impairments, in accordance with at least one embodiment. FIG. 2A depicts an image that has been up-scaled. An up-scaled image may be the result of a low-resolution image being scaled to fit a larger area then originally intended. By way of example, the image depicted in FIG. 2A may be a 720p image that as displayed on a 1080p screen. FIG. 2B depicts an image (e.g., an interlaced image) that include interlacing. Interlacing (also known as interleaving) is a method of doubling the perceived frame rate of a video display without consuming extra bandwidth. An interlaced signal contains two fields of a video frame captured consecutively. An interlaced image is then constructed using the two fields, where one field contains all odd-numbered pixel rows and the other field contains all even-numbered pixel rows. An interlacing impaired image may include errors in constructing the image that produce the affect depicted in FIG. 2B. FIG. 2C depicts an image with H.264 encoding errors. FIG. 2D depicts an image with MPEG-2 encoding errors. FIG. 2E depicts an image with compression errors.

Returning to FIG. 1, at 118, the service provider computer(s) 102 may execute transformation operations (e.g., a mean-subtracted contrast normalization (MSCN) transform) on the intensity components of a video frame (e.g., video frame 110) to compute MSCN coefficients on local spatial neighborhoods of the video frame such that the distribution of such coefficients may be identified. Images 120-124 (examples of images 302-306 of FIG. 3) depict the execution of the MSCN transform on the video frame 110. In some embodiments, if the video frame 110 is original in a format different from the YUV color space, the video frame data (e.g., pixel values) of video frame 110 may be converted to the YUV color space prior to executing the transformation operations.

Given an input color image $I_{in}$(RGB), where RGB values are linearized and gamma-decompressed, the RGB value of each pixel of the image may be converted to YUV color space using the following conversions (referred to collectively as formula 1).

$$Y = 0.299R + 0.587G + 0.114B$$

$$U = -0.147R - 0.289G + 0.436B$$

$$V = 0.615R - 0.515G - 0.100B$$

The YUV color space is defined in terms of a luma component (Y) indicating brightness/intensity and two chrominance components (e.g., U (blue projection), and V (red projection)) that indicate color. Thus, through the conversion to YUV color space, the intensity of a pixel is split from the chrominance components.

In some embodiments, once converted to the YUV color space, the MSCN transform is applied to the intensity component $I_{in}$(Y) as defined by the following equations.

$$\mu(Y)(x,y) = \text{mean}(I_{in}(Y)(x_i,y_i)) \forall x_i, y_i \in W$$

$$\sigma(Y)(x,y) = \text{stdev}(I_{in}(Y)(x_i,y_i)) \forall x_i, y_i \in W \quad \text{Equation 2:}$$

$$N(Y)(x, y) = \frac{I_{in}(Y)(x, y) - \mu(Y)(x, y)}{\sigma(Y)(x, y)} \quad \text{Equation 3}$$

W is the neighbor window size. In some embodiments, W can be set to a value (e.g., 13).

Figure 3:
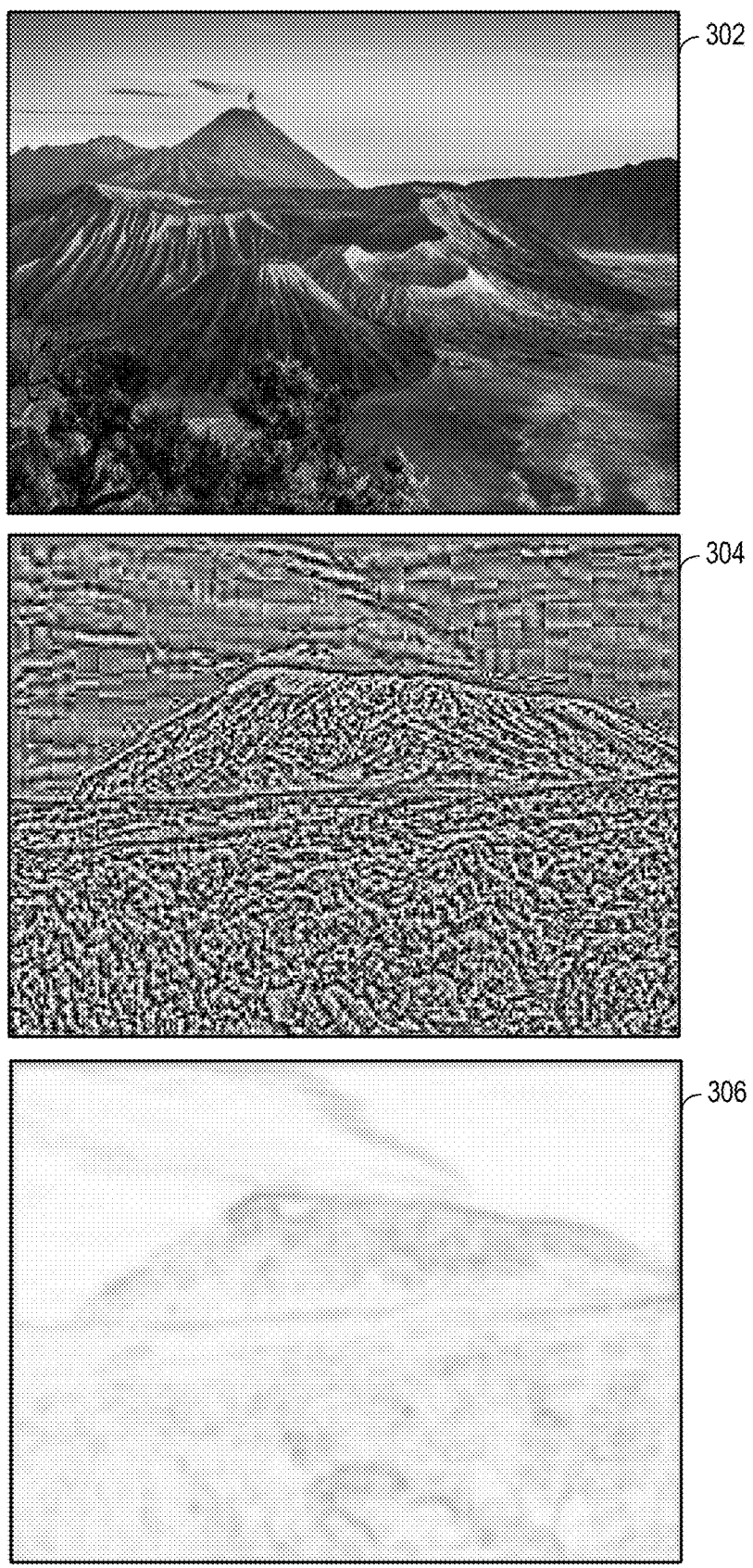
FIG. 3 illustrates the results of performing pre-processing operations to prepare an image for input to an image impairment detection model, in accordance with at least one embodiment.

FIG. 3 illustrates the results of performing pre-processing operations to prepare an image for input to an image impairment detection model, in accordance with at least one embodiment. Image 302 depicts the intensity channel of the original image (e.g., the Y component of the original image).

Image 304 depicts N(Y) as defined above by equation 3. Image 306 depicts α(Y) as defined by equation 2. Both images 302 and 304 have the neighboring window set to 13. For better visualization, image 304 pixel values are normalized and a constant offset (e.g., 127) is added to show both negative and positive portions. The values of image 306 are inverted for better visualization.

The output of the pre-process image ($I_{pre}$) contains N(Y) (x, y) and σ(Y)(x, y) as defined in equations 2 and 3. As the color channels, U and V of $I_{in}$ are also included the resultant image is a four-channel image (e.g., pre-processed image 130 of FIG. 1) as defined by equation 4 as follows:

$$I_{pre}(x,y)=[N(Y),\sigma(Y),I_{in}(U),I_{in}(V)](x,y)$$

Returning once again to FIG. 1, at 126, the transformed video frame data (pre-processed image 130, including one or more components of the transformed video frame such as any suitable combination of N(Y), σ(Y), $I_{in}$(U), $I_{in}$(V) of each pixel of the video frame) may be provided to the image impairment detection model 128 as input. In some embodiments, the image impairment detection model 128 may be previously trained to identify whether an input image (e.g., a video frame data provided as input) includes one or more impairments. In some embodiments, the training data set used to train the image impairment detection model 128 may utilize examples for which any suitable combination of the four channels N(Y), σ(Y), $I_{in}$(V)) are known. By way of example, N(Y) and σ(Y) may be utilized for an image impairment detection model that is trained to identify interlacing errors (also referred to as "combing"), and/or H.264 encoding errors, and/or MPEG-2 encoding errors. As another example, N(Y), σ(Y), and $I_{in}$(V) may be utilized for an image impairment detection model that is trained to identify up-scaled images and/or compression errors. In part, these particular combination of data may be utilized based on an observation that combing and video hit artifacts can be modeled by an edge cue of gray level images, whereas up-scaled and compression artifacts are more obvious in color images. The transformed video frame data including the MSCN coefficients (e.g., any suitable combination of N(Y), σ(Y), $I_{in}$(U), $I_{in}$(V) may be provided to the IMD model as input.

At 132, The IMD model 128 may provide an output (e.g., impairment mapping 134) that indicates whether the video frame includes an impairment that the IMD model 128 was trained to identify. In some embodiments, this output may include impairment mapping 134 maps each pixel to a corresponding indicator that indicates the presence or absence of an impairment. The impairment mapping 134 can therefore indicate for each pixel of the input 130 whether the pixel indicates an impairment or whether the pixel does not indicate an impairment. A ratio between pixels that indicate an impairment and pixels that do not indicate an impairment can be calculated, and the video frame can be considered to include the impairment if the ratio meets and/or exceeds a predefined threshold.

At 136, a set of operations may be executed based at least in part on the output and/or a determination that the video frame includes/does not include the impairment. By way of example, if the input 130 is determined to not include the impairment (and/or any impairment) the video frame can be streamed as requested to the user device. In some embodiments, the service provider computer(s) 102 may determine that over a threshold number of video frames of the content 106 are free of impairments. If so, the service provider computer(s) 102 may stream the content 138 to the user device 140, where the content 138 is the content 106 provided by the content provider computer(s) 104. However, if the video frame (or at least some threshold number of video frames of content 106) is determined to include the impairment (e.g., one or more impairments), the service provider computer(s) 102 may be configured to request alternate content. By way of example, the service provider computer(s) 102 may request that the content provider computer(s) 104 adjust/optimize their pre-processing or compression parameter settings to re-generate and re-deliver the content 106, such as using higher bitrates to remove compression defects. As another example, the service provider computer(s) 102 may request that the content provider computer(s) 104 provide correct video and video meta-data, such as true HD (high-definition) video instead of up-scaled from SD (standard-definition). In some embodiments, the service provider computer(s) 102 may turn on certain pre-processing modules to remove or reduce the defects on the video frames, such as de-interlacing to reduce interlacing/combing defects, or de-blocking filter for reducing blockiness defects.

Figure 4:
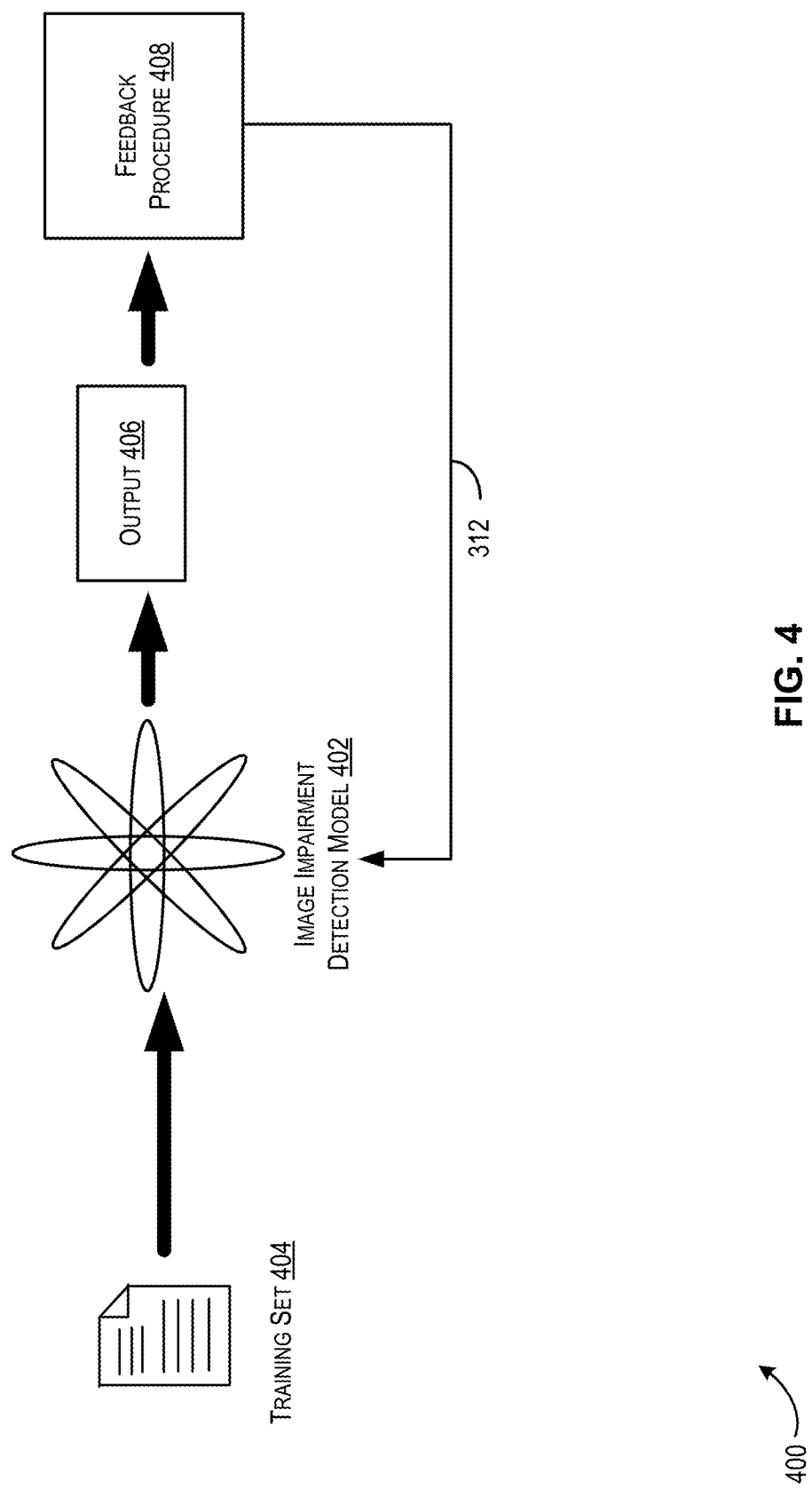
FIG. 4 illustrates a flow for a method of maintaining and/or generating an image impairment detection model, in accordance with at least one embodiment.

FIG. 4 illustrates a flow 400 for a method of maintaining and/or generating an image impairment detection model, in accordance with at least one embodiment. The image impairment detection model 402 may be an example of the IMD model 128 of FIG. 1. The operations of flow 400 may be performed by an image impairment detection engine discussed later with respect to FIGS. 7 and 8.

In some embodiments, the IMD model 402 may be configured to accept as input training set 404. Training set 404 may be obtained by the IMD model 402 from a data store accessible to the image impairment detection engine. Training set 404 (also referred to as a training data set) may include any suitable number of example images and corresponding image data including MSCN coefficients as described above (e.g., N(Y), σ(Y), $I_{in}$(U), $I_{in}$(V)) for each pixel of the corresponding image). In some embodiments, training set 404 may include an indicator and/or label that indicates the image is a positive example (e.g., includes an impairment corresponding to the IMD model 402, includes a specific impairment of a set of possible impairments) or a negative example (e.g., does not include an impairment corresponding to the IMD model 402, includes no impairments from a set of possible impairments). In some embodiments, the training set 404 may be specific to a particular impairment of a set of possible impairment. By way of example, the training set 404 may include positive examples of images that include up-scaled images and negative examples that include images which have not been up-scaled. Thus, the IMD model 402 may be trained with the training set 404 to identify a specific type of impairment (e.g., up-scaling) from subsequent inputs. In some embodiments, the operations of flow 400 may be performed any suitable number of times to train any suitable number of IMD models to detect respective types of impairments from input image data. By way of example, while the IMD model 402 may be trained to identify up-scaling, a separate IMD model may be trained (using a different training set) to detect interlacing errors. Thus, an IMD model may be specific to a particular impairment or the IMD model may be trained to detect multiple impairments.

The image impairment detection model 402 may be an example of a neural network.

Figure 5:
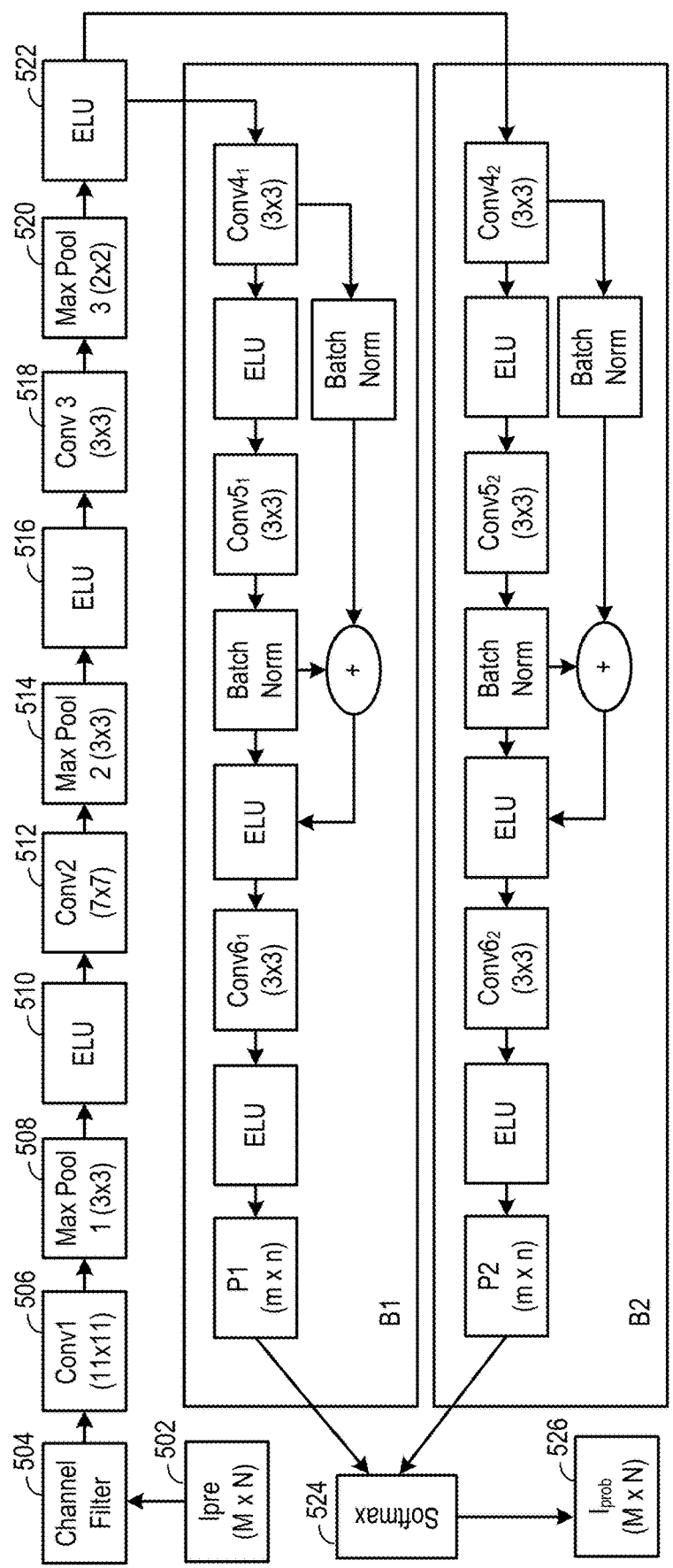
FIG. 5 is a schematic diagram of an example neural network structure of an example image impairment detection model, in accordance with at least one embodiment.

FIG. 5 is a schematic diagram of an example architecture for an image impairment detection model (e.g., neural network 500), in accordance with at least one embodiment. Neural network 500 is an example of an image impairment detection model. A "neural network" (NN) is a computing system that includes a collection of connected nodes (e.g., neurons, perceptrons, sigmoid neurons, etc.) that loosely model the neurons in a biological brain. Each connection, like the synapses in a biological brain, can transmit a signal to other neurons. An artificial neuron that receives a signal may process it and send an output signal to neurons with which it is connected. The connections (sometimes referred to as "edges") may be associated with weights and/or biases that may be adjusted as learning proceeds to effect an output of the neuron. Typically, neurons are aggregate into layers and different layers may perform different transformations on their inputs. NNs with multiple layers may also be referred to as "deep neural networks." Signals proceed through layers of neurons of the NN until an output is determined. Neural networks are often used for machine learning, in which a computer learns to perform some tasks (e.g., to classify an image) by analyzing training examples. In some cases, the training examples may be pre-labeled to indicate certain aspects of the example (e.g., an example image contains a cat, a number "9," etc.). The machine learning conducted using neural networks can be supervised, semi-supervised, or unsupervised.

Neural network 500 may include any suitable number of convolution layers (e.g., 3, such as Conv1 layer 506, Conv2 layer 512, Conv3 layer 514), each of which are followed by a max pooling layer (e.g., layers 508, 514, and 520) to reduce the dimension. Each max pooling layer may then be followed by an exponential rectify layer (ELU) (e.g., ELU layers 510, 516, and 522) to prevent gradients from exploding. Convolution layers may be utilized to extract features from the input image ($I_{pre}$) (the four-channel image resulting from the pre-processing described in connection with FIG. 3 provided at 502. Channel filter layer 504 may be utilized to select one or more channels from the four-channel image from which features of the input image are to be extracted via the layers 506-522. The output of ELU layer 522 are the region level (REG) features. The impairment detection may be modeled as a classification problem where each REG is classified as either negative (high quality) or positive (impairment detected).

The neural network 500 may include a dual-path (parallel) network including network B1 and network B2. B1 and B2 may each take the REG features as input and employ three additional convolution layers to compute responses for the positive class (with B1) and the negative class (with B2). By utilizing a dual-path network including B1 and B2, the accuracy of the neural network 500 may be greater than neural network that utilize a single branch. This heightened accuracy may also be achieved without adding more convolution layers, which in turn helps make the neural network 500 easier to train and conduct inferences at a faster speed.

In some embodiments, B1 and B2 are implemented using the residual network structure. For example, layer Conv5$_1$ and Conv5$_2$ are skipped over activation of Conv4$_1$ and Conv4$_2$, in order to address any gradient vanishing problems. Finally, the output of B1 and B2 are sent into a softmax layer to generate a binary class probability map matrix $I_{prob}$, an example of the impairment mapping 134 of FIG. 1 as defined in equation 5:

$$I_{prob}(x, y) = \frac{e^{P2(x,y)}}{e^{P1(x,y)} + e^{P2(x,y)}}$$

In some embodiments, a cross-entropy loss function may be utilized to back propagate the network during the training process.

The disclosed techniques first build a shallow network with only three convolution layers to extract the REG level features from an input image, and then builds a dual-path network with discriminative neurons to effectively separate high quality images from impaired images. The techniques substantially improve the accuracy of detecting impairments within an input image. In addition, these REG features have much lower dimension. Specifically, the REG features may be much (e.g., 324 (9×9×4)) times smaller than the input image. The low complexity of the neural network and the dimension reduction have dramatically reduced the computational time needed for impairment detection. Additionally, by including both intensity and color components (e.g., N(Y), σ(Y), $I_{in}$(U), $I_{in}$(V)) the accuracy of detection is improved as it is observed that color helps detect some types of impairments such as the up-scaling artifact.

Thus, to detect artifacts indicative of an impairment within an input image, the image is first pre-process and run through neural network 500 to obtain a region level probability matrix $I_{prob}$ (provided at 526).

Figure 6:
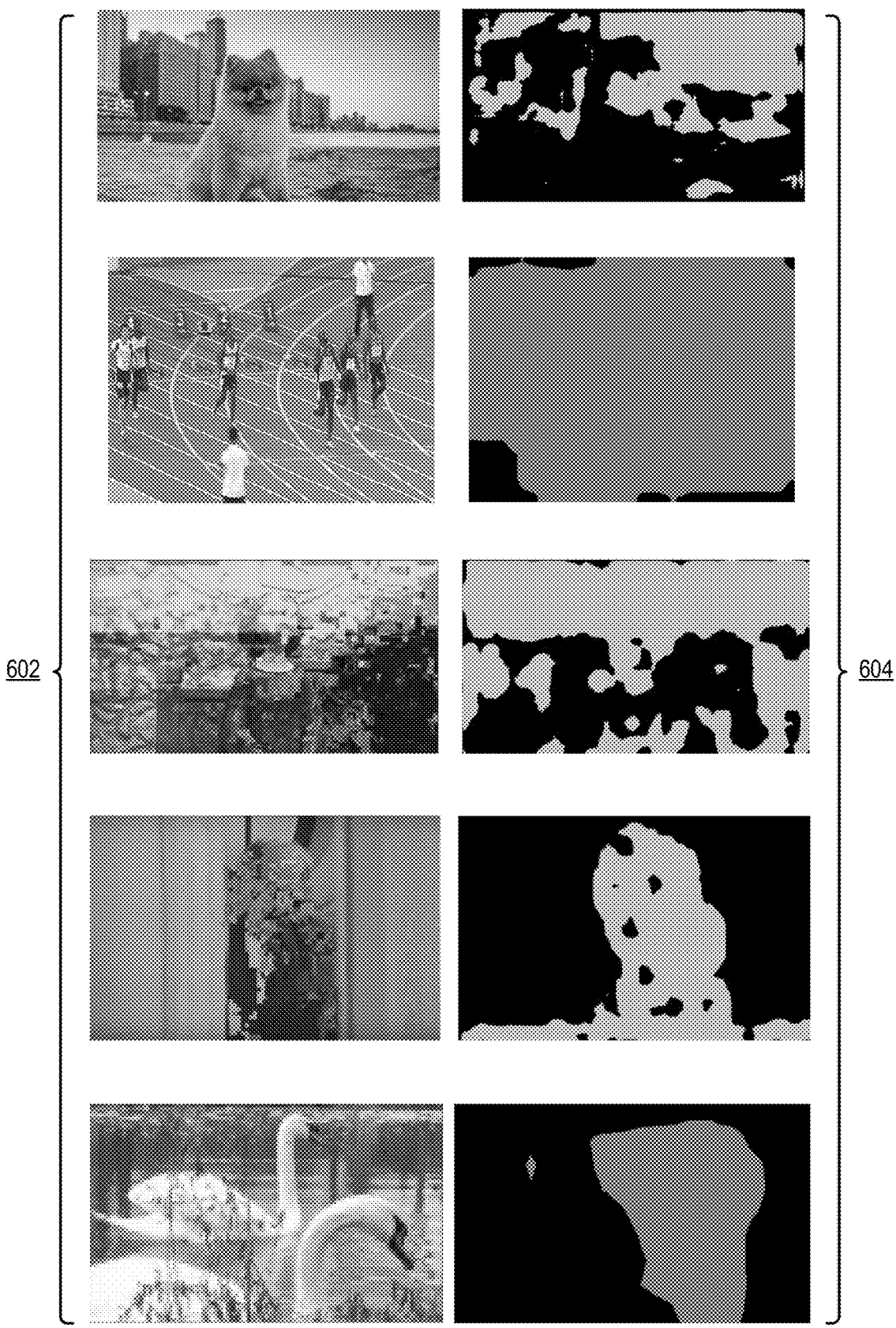
FIG. 6 illustrates a number of input images and their corresponding output images as provided by an image impairment detection model, in accordance with at least one embodiment.

FIG. 6 illustrates a number of input images and their corresponding output images as provided by an image impairment detection (IMD) model (e.g., the IMD model 128 of FIG. 1, the IMD model 402 of FIG. 4, the neural network 500 of FIG. 5) in accordance with at least one embodiment. Sample images 602 are provided on the left that are impaired by different artifact that are indicated by the output results 604 on the right (e.g., being an example of the impairment mapping 134 of FIG. 1). Here, the bright pixels depict the positive area where probability values greater than a threshold value (e.g., 0.5) indicate an impairment was detected (e.g., an impairment artifact was detected).

Returning to FIG. 4, output 406 (e.g., $I_{prob}$ as provided by neural network 500, impairment mapping 134 of FIG. 1, etc.) may be obtained from image impairment detection (IMD) model 402.

As the IMD model 402 is utilized to classify new input images (e.g., video frames) as including one or more impairments or not including one or more impairments, the output 406 provided by the IMD model 402 may be utilized with feedback procedure 408 to improve the accuracy of the IMD model 402. In some embodiments, the feedback procedure 408 may include providing any suitable portion of the output 406 to one or more users and/or one or more remote systems (e.g., image impairment detection systems, crowdsource data collection systems, etc.). By way of example, an input image and output 406 (or a determination that the image includes one or more impairments or does not include one or more impairments). A user (e.g., an experienced impairment identifier) of the crowdsource system may provide input indicating agreement or disagreement with the determination that an input image includes an impairment or does not include an impairment (as determined from the output 406 provided by IMD model 402).

The feedback obtained through execution of the feedback procedure 408 (e.g., indicating agreement or disagreement with the assessments made regarding the existence of impairment(s) within the input image) may be provided to the IMD model 402 at 410 in order to improve the accuracy of the IMD model 402 by expanding the training set with which IMD model 402 is eventually retrained.

Figure 7:
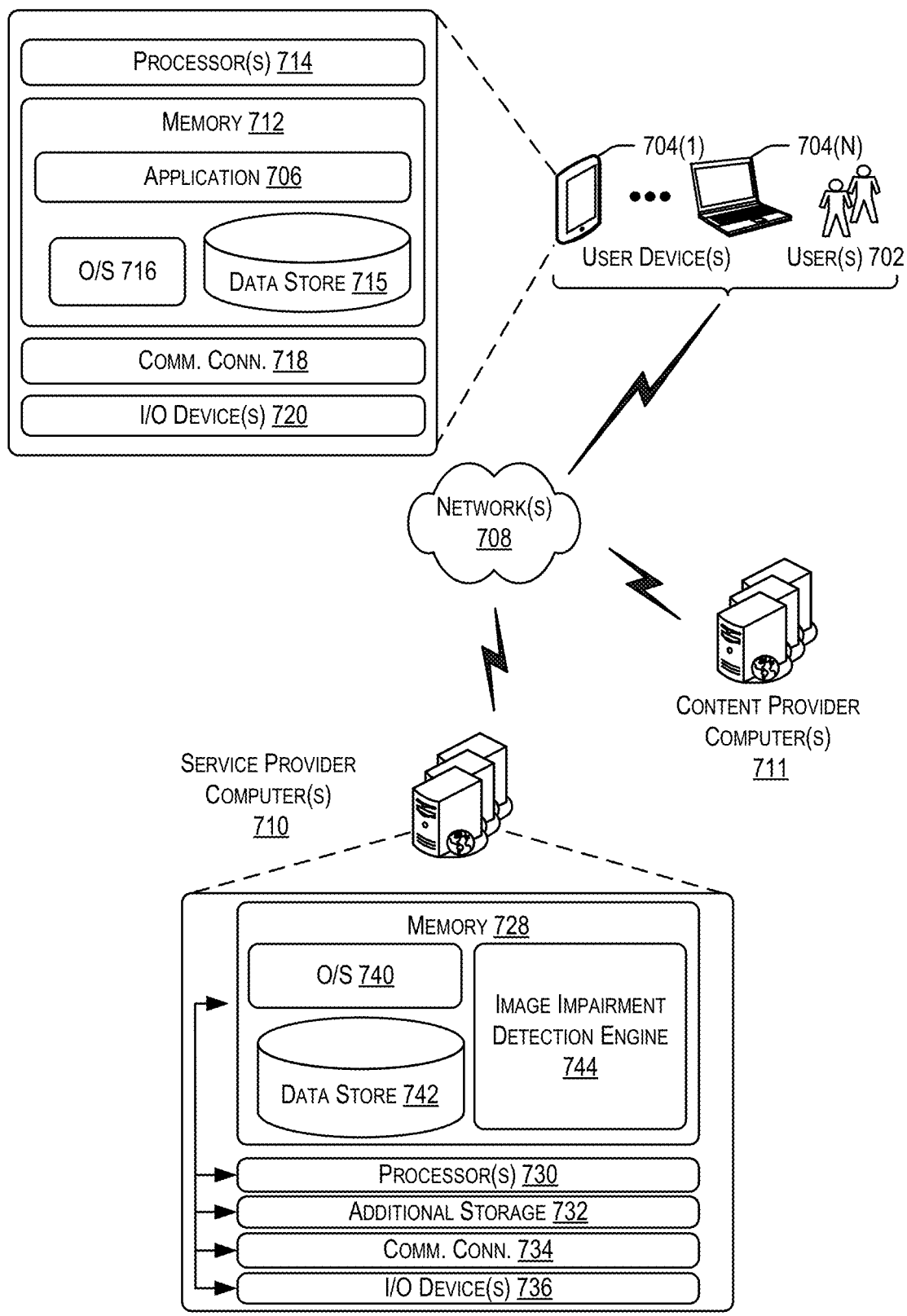
FIG. 7 illustrates components of an image impairment detection system, in accordance with at least one embodiment.

FIG. 7 illustrates components of an image impairment detection system 700 according to a particular embodiment.

In image impairment detection system 700, one or more user(s) 702 may utilize a user device (e.g., a user device of a collection of user device(s) 704 to navigate to a network page provided by the service provider computer(s) 710 to request video content to be streamed to the user device(s) 704. For example, the user may access a user interface accessible through an application 706 running on the user device(s) 704 via one or more network(s) 708. In some aspects, the application 706 operating on the user device(s) 704 may be hosted, managed, and/or provided by a computing resources service or service provider, such as by utilizing one or more service provider computer(s) 710.

In some examples, the network(s) 708 may include any one or a combination of many different types of networks, such as cable networks, the Internet, wireless networks, cellular networks, and other private and/or public networks. While the illustrated example represents the user(s) 702 accessing application functionality over the network(s) 708, the described techniques may equally apply in instances where the user(s) 702 interact with the service provider computer(s) 710 via the one or more user device(s) 704 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the image impairment detection engine 744, discussed further below in more detail, may operate in whole or in part on the user device(s) 704. Thus, in some embodiments, the user(s) 702 may access the functionality of the image impairment detection engine 744 directly through the user device(s) 704 and/or the service provider computer(s) 710 via user interfaces provided by the image impairment detection engine 744.

In some embodiments, the application 706 may allow the user(s) 702 to interact with the service provider computer(s) 710. For example, a user may utilize the application 706 to select video content. In at least one example, the application 706 may provide a network page and/or user interfaces with which the user(s) 702 may select from a library of video content. The application 706 may be configured to transmit (electronically convey) the user's input(s) to the service provider computer(s) 710, operating at the user device(s) 704 and/or the service provider computer(s) 710. The service provider computer(s) 710 may in turn be configured to request the selected video content from content provider computer(s) 711. The application 706 may further be configured to receive, process, and/or display the video content as streamed by the service provider computer(s) 710.

The service provider computer(s) 710, perhaps arranged in a cluster of servers or as a server farm, may host the application 706 operating on the user device(s) 704 and/or cloud-based software services. Other server architectures may also be used to host the application 706 and/or cloud-based software services. The application 706 operating on the user device(s) 704 may be capable of handling requests from the user(s) 702 and serving, in response, various user interfaces that can be rendered at the user device(s) 704. The application 706 operating on the user device(s) 704 can present any suitable type of website that supports user interaction, including search engine sites, video content detail pages, and the like. The described techniques can similarly be implemented outside of the application 706, such as with other applications running on the user device(s) 704.

The user device(s) 704 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 704 may be in communication with the service provider computer(s) 710 via the network(s) 708, or via other network connections.

In one illustrative configuration, the user device(s) 704 may include at least one memory 712 and one or more processing units (or processor(s)) 714. The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described.

The memory 712 may store program instructions that are loadable and executable on the processor(s) 714, as well as data generated during the execution of these programs. Depending on the configuration and type of user computing device, the memory 712 may be volatile (such as random access memory (RAM)) and/or non-volatile (such as read-only memory (ROM), flash memory, etc.). The user device(s) 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 712 may include multiple different types of memory, such as static random access memory (SRAM), dynamic random access memory (DRAM), or ROM.

Turning to the contents of the memory 712 in more detail, the memory 712 may include an operating system 716, one or more data stores 715, and one or more application programs, modules, or services provided via the application 706 (e.g., a browser application, a video player application, etc.). The application 706 may be configured to receive, store, and/or display a network page or other interfaces for interacting with the service provider computer(s) 710. The application 706 may include any suitable video player functionality for playing video content as streamed and/or otherwise provided by the service provider computer(s) 710. Additionally, the memory 712 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 704 may also contain communications connection(s) 718 that allow the user device(s) 704 to communicate with a stored database, another computing device or server (e.g., the service provider computer(s) 710), user terminals and/or other devices on the network(s) 708. The user device(s) 704 may also include I/O device(s) 720, such as a keyboard, a mouse, a pen, a voice input device, a touch input device, a display, speakers, a printer, etc.

In some aspects, the service provider computer(s) 710 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 710 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 710 may be in communication with the user device(s) 704 and/or other service providers via the network(s) 708 or via other network connections. The service provider computer(s) 710 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 710 may include at least one memory 728 and one or more processing units (or processor(s)) 730. The processor(s) 730 may be implemented as appropriate in hardware, computer-executable instructions, firmware, or combinations thereof. Computer-executable instruction or firmware implementations of the processor(s) 730 may include computer-executable or machine-executable instructions written in any suitable programming language to perform the various functions described.

The memory 728 may store program instructions that are loadable and executable on the processor(s) 730, as well as data generated during the execution of these programs. Depending on the configuration and type of service provider computer(s) 710, the memory 728 may be volatile (such as RAM) and/or non-volatile (such as ROM, flash memory, etc.). The service provider computer(s) 710 or servers may also include additional storage 732, which may include removable storage and/or non-removable storage. The additional storage 732 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 728 may include multiple different types of memory, such as SRAM, DRAM, or ROM.

The memory 728, the additional storage 732, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 728 and the additional storage 732 are all examples of computer storage media. Additional types of computer storage media that may be present in the service provider computer(s) 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 710. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 710 may also contain communications connection(s) 734 that allow the service provider computer(s) 710 to communicate with a stored database, another computing device or server (e.g., content provider computer(s) 711), user terminals and/or other devices on the network(s) 708. The service provider computer(s) 710 may also include I/O device(s) 736, such as a keyboard, a mouse, a pen, a voice input device, a touch input device, a display, speakers, a printer, etc.

Turning to the contents of the memory 728 in more detail, the memory 728 may include an operating system 740, one or more data stores 742, and/or one or more application programs, modules, or services for implementing the features disclosed herein, such as the features provided by the image impairment detection engine 744. The image impairment detection engine 744 may be configured to perform the operations discussed above in connection with FIGS. 1, 4, and 5.

The content provider computer(s) 711 may be any suitable type of computing device such as, but not limited to, a mobile phone, a hand-held scanner, a touch screen device, a smartphone, a server computer, a distributed system, a personal digital assistant (PDA), a laptop computer, a desktop computer, a tablet PC, etc. In some examples, the content provider computer(s) 711 may be configured to access and provide video content in a variety of formats, utilizing a variety of codecs to encode the content and/or a variety of compression algorithms for compressing the video content. The content provider computer(s) 711 may be in communication with the service provider computer(s) 710 via the network(s) 708, or via other network connections. The content provider computer(s) 711 may be configured to receive content requests (e.g., from service provider computer(s) 710) and serve, in response to those requests, the requested video content (potentially according to various request parameters provided in the request that further indicate a video format, codec, and/or compression algorithm requested).

Figure 8:
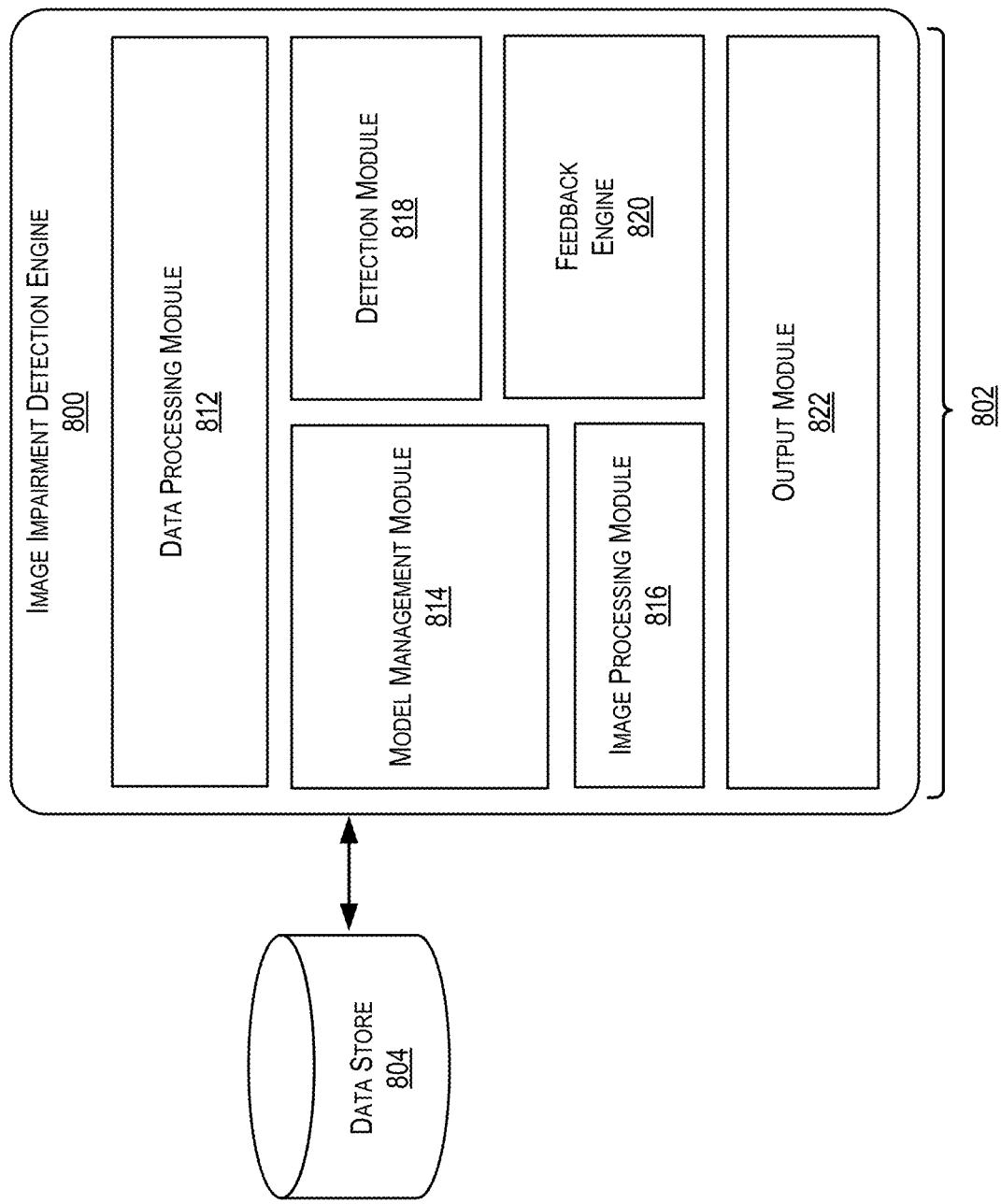
FIG. 8 is a schematic diagram of an example computer architecture for an image impairment detection engine, including a plurality of modules that may perform functions in accordance with at least one embodiment.

FIG. 8 is a schematic diagram of an example computer architecture for an image impairment detection engine 800 (e.g., the image impairment detection (IMD) engine 744 of FIG. 7), including a plurality of modules 802 that may perform functions in accordance with at least one embodiment. The modules 802 may be software modules, hardware modules, or a combination thereof. If the modules 802 are software modules, the modules 802 can be embodied on a computer readable medium and processed by a processor in any of the computer systems described herein. It should be noted that any module or data store described herein, may be, in some embodiments, be a service responsible for managing data of the type required to make corresponding calculations. The modules 802 may be exist as part of the image impairment detection engine 800 operating on the service provider computer(s) 710 of FIG. 7, or the modules may exist as separate modules or services external to the service provider computer(s) 710 (e.g., as part of the application 706 of FIG. 7 operating on the user device(s) 704 of FIG. 7).

In the embodiment shown in the FIG. 8, a data store 804 is shown, although content data can be maintained, derived, or otherwise accessed from various data stores, either remote or local to the image impairment detection engine 800, to achieve the functions described herein. In at least one embodiment, the data stores described herein may be physically located on the user device(s) 704 or alternatively, any suitable combination of the data stores may be operated as part of the service provider computer(s) 710, for example, as part of an image impairment detection engine 800. The image impairment detection engine 800, as shown in FIG. 8, includes various modules such as a data processing module 812, a model management module 814, an image processing module 816, a detection module 818, a feedback engine 820, and an output module 822. Some functions of the modules 802 are described below. However, for the benefit of the reader, a brief, non-limiting description of each of the modules is provided in the following paragraphs. In accordance with at least one embodiment, a process is identifying potential feature combinations for a new item.

In at least one embodiment, the image impairment detection engine 800 includes the data processing module 812. Generally, the data processing module 812 may be utilized to receive any suitable information with respect to any example provided herein. The data processing module 812 may include any suitable number of application programming interfaces with which the functionality of the image impairment detection engine 800 may be invoked.

In some embodiments, the data processing module 812 may be configured to receive video content (also referred to as "content" or "content data"). The data processing module 812 may be configured to store the content data received within the data store 804. Similarly, the data processing module 812 may be configured to receive training data and/or feedback data which may be stored in the data store 804 (or separate data stores accessible to the IMD engine 800. The data processing module 812 may further be configured to receive user input provided via one or more user interfaces managed by the image impairment detection engine 800 (e.g., by the feedback engine 820, the output module 822, etc.). The data processing module 812 may be configured to provide any suitable information received to any suitable combination of the remaining modules 802.

In some embodiments, the data processing module 812 may receive user input indicating a request for particular video content. In some embodiments, the data processing module 812 may stimulate the output module 822 (e.g., by passing information provided in the request) to request the video content from a content provider (e.g., the content provider computer(s) 711 of FIG. 7). Subsequently, the data processing module 812 may receive input video content (e.g., one or more frames of video content as provided by the content provider computer(s) 711). In some embodiments, the data processing module 812 may be configured to store any received data within data store 804.

In some embodiments, the model management module 814 may be configured to train a model (e.g., a neural network such as the neural network 500, the IMD model 402 of FIG. 4, the IMD model 128 of FIG. 1, etc.) to detect one or more impairments within an input image (e.g., a video frame provided to the model as input). Output provided by the model may include the input image and an indication that the image includes, or does not include, the impairment(s) that the IMD model has been trained to detect. In some embodiments, this indication may be in the form of a mapping (e.g., the impairment mapping 134, $I_{prob}$ discussed in connection with FIG. 5, the output images 604 of FIG. 6, etc.) from which a determination may be made (e.g., by identifying whether the number of pixels that indicate an impairment versus the total number of pixels meets or exceeds a threshold) that the image includes, or does not include, the impairment. The model management module 814 may obtain training data from the data store 804. In some embodiments, the training data (e.g., training set 404 of FIG. 4) may be previously stored in data store 804, or the image impairment detection engine 800 may receive the training set from any suitable source and store the training set 404 in data store 804 for subsequent use. The model management module 814 may be configured to train and/or retrain the IMD models discussed above utilizing the training set and any suitable supervised, unsupervised, or semi-supervised learning algorithm. For example, the model management module 814 may be configured to execute the operations discussed above in connection with FIG. 4.

Once the model management module 814 has trained one or more IMD model(s), these model(s) may be utilized to detect impairments in subsequently provided images (e.g., video frames). The data processing module 812 may configured to receive video content (e.g., from the content provider computer(s) 711) and provide the video content (e.g., entirely, or individual frames) to the image processing module 816. The image processing module 816 may be configured to execute the preprocessing operations discussed above in connection with FIG. 1. By way of example, the image processing module 816 can convert the video content data from one format (e.g., RGB color space) to another format (e.g., YUV color space) to separate intensity and color components. Thus, the operations discussed in connection with FIG. 3 may be performed by the image processing module 816.

In some embodiments, the detection module 818 accesses the IMD model(s) (e.g., the neural network 500) and provides video content data (e.g., the video content data as modified by the image processing module 816) as input to the IMD model(s). In some embodiments, the IMD model(s) may provide output indicating the image includes or does not include an impairment. In some embodiments, the output may additionally or alternatively include a mapping that indicates for each pixel a probability that the pixel is related to an impairment. If the IMD model(s) do not provide a specific indicator that indicates the image includes or does not include an impairment, the detection module 818 may be configured to make a determination that the image includes or does not include one or more impairments based on the output provided by the IMD model(s).

According to some embodiments, the output module 822 provides one or more user interfaces with which a training set may be selected, content selection and/or requests may be obtained. For example, the one or more interfaces may be configured to enable a user to select and/or specify particular video content to be requested. In some embodiments, the detection module 818 may trigger outputs by the output module 822. By way of example, if no impairments are detected with the video content, the detection module 818 may cause the output module 822 to output (e.g., stream) the video content (or at least the frame determined to be free of impairments) to a user device (e.g., the requesting user device, one of the user device(s) 704 of FIG. 7). Should the detection module 818 determine that the image includes an impairment, it may execute logic to determine a set of operations to execute in response to this determination. In some embodiments, the one or more operations include at least one of 1) requesting alternate video content from the content provider (e.g., requesting an HD video when the video content originally provided with in SD format, requesting a different codec and/or compression to be utilized, etc. or ii) executing a set of operations to mitigate the effects of the image impairment artifact. In some embodiments, the detection module 818 may be configured with code that, when executed, causes the impairment to be reduced or removed from the video frame. For example, the detection module 818 can execute a predefined algorithm for de-interlacing to reduce interlacing/combing defects, or a de-blocking filter for reducing blockiness defects.

The feedback engine 820 may be configured to solicit feedback data. The feedback data may include negative feedback or positive feedback corresponding to disagreement or agreement of the user in a determination made by the IMD model and/or the determination inferred from output provided by the IMD model. The feedback engine 820 may determine that the feedback data indicates the user(s) agreed with the output or determination inferred from the output of the IMD model. In response to determining that the feedback data indicates agreement, the feedback engine 820 may store the input image, the output, and the indication that the image includes or does not include an impairment as a new example within the training set. At any suitable time, the feedback engine 820 may trigger the model management module 814 to retrain the IMD model(s) based on the new training set, or the model management module 814 may be configured to retrain the IMD model(s) according to a predefined periodicity and/or schedule. Thus, in some embodiments, the feedback engine 820 may be configured to perform the functions described above in connection with the feedback procedure 408 of FIG. 4.

Figure 9:
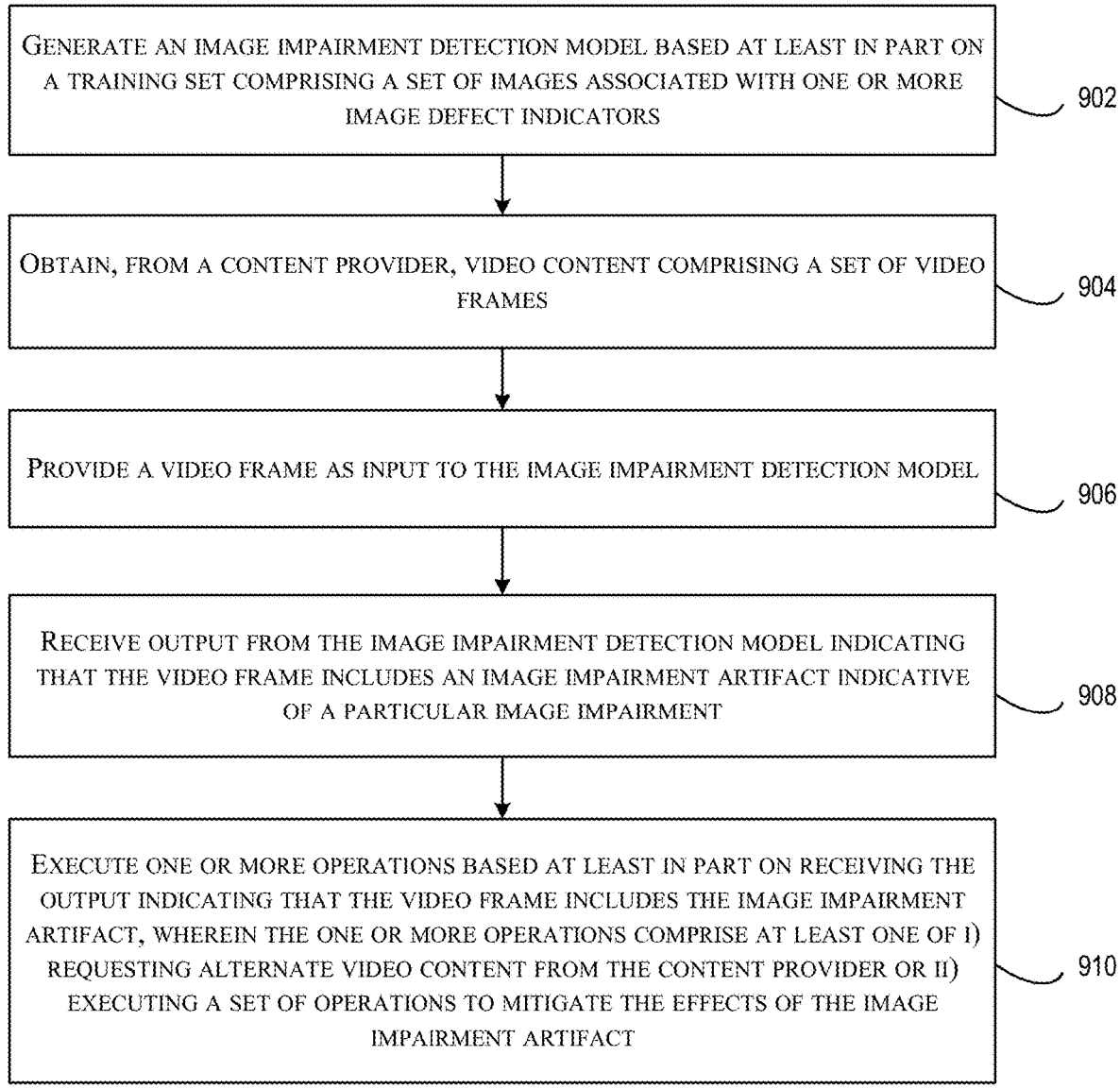
FIG. 9 is a flowchart illustrating an example method for detection an image impairment within a video frame, in accordance with at least one embodiment.

FIG. 9 is a flowchart illustrating an example method for detecting an image impairment within a video frame utilizing an image impairment detection engine 800 of FIG. 8, in accordance with at least one embodiment. A computer-readable medium may store computer-executable instructions that, when executed by at least one processor, cause at least one computer to perform instructions comprising the operations of the method 900. It should be appreciated that the operations of the method 900 may be performed in any suitable, not necessarily the order depicted in FIG. 9. Further, the method 900 may include additional, or fewer operations than those depicted in FIG. 9. The operations of method 900 may be performed by any suitable combination of the modules 802 of the image impairment detection engine 800 of FIG. 8 which may operate in whole or in part on a user device (e.g., one or more of the user device(s) 704 of FIG. 7) and/or the service provider computer(s) 710 of FIG. 7.

The method 900 may begin at 902, where an image impairment detection model (e.g., IMD model 128 of FIG. 1, IMD model 402 of FIG. 4, neural network 500 of FIG. 5, etc.) may be generated (e.g., by the model management module 814 of FIG. 8). In some embodiments, the IMD model may be generated based at least in part on a training set comprising a set of images associated with one or more image defect indicators. In some embodiments, the IMD model need not be generated by the model management module 814 of FIG. 8. Instead, a separate system or module may generated the IMD model and the model management module 814 may access the model directly (e.g., for retraining purposes) or cause the model to be retrained via the separate system.

At 904, video content comprising a set of video frames may be obtained (e.g., by the image impairment detection engine 800) from a content provider (e.g., the content provider computer(s) 711 of FIG. 7). In some embodiments, the video content may include any suitable movie, television episode, video clip, etc.

At 906, a video frame may be provided as input to the image impairment detection model. In some embodiments, a set of preprocessing operations (e.g., the operations discussed in connection with FIG. 3) may be executed (e.g., by the image processing module 816 of FIG. 8) on the video frame prior to it being provided to the model as input.

At 906, output may be received (e.g., by the detection module 818) from the IMD model indicating that the video frame includes an image impairment artifact indicative of a particular image impairment.

At 910, one or more operations may be executed (e.g., by the output module 822 of FIG. 8) based at least in part on receiving the output indicating that the video frame includes the image impairment artifact. In some embodiments, the one or more operations may comprise at least one of i) requesting alternate video content from the content provider or ii) executing a set of operations to mitigate the effects of the image impairment artifact.

Figure 10:
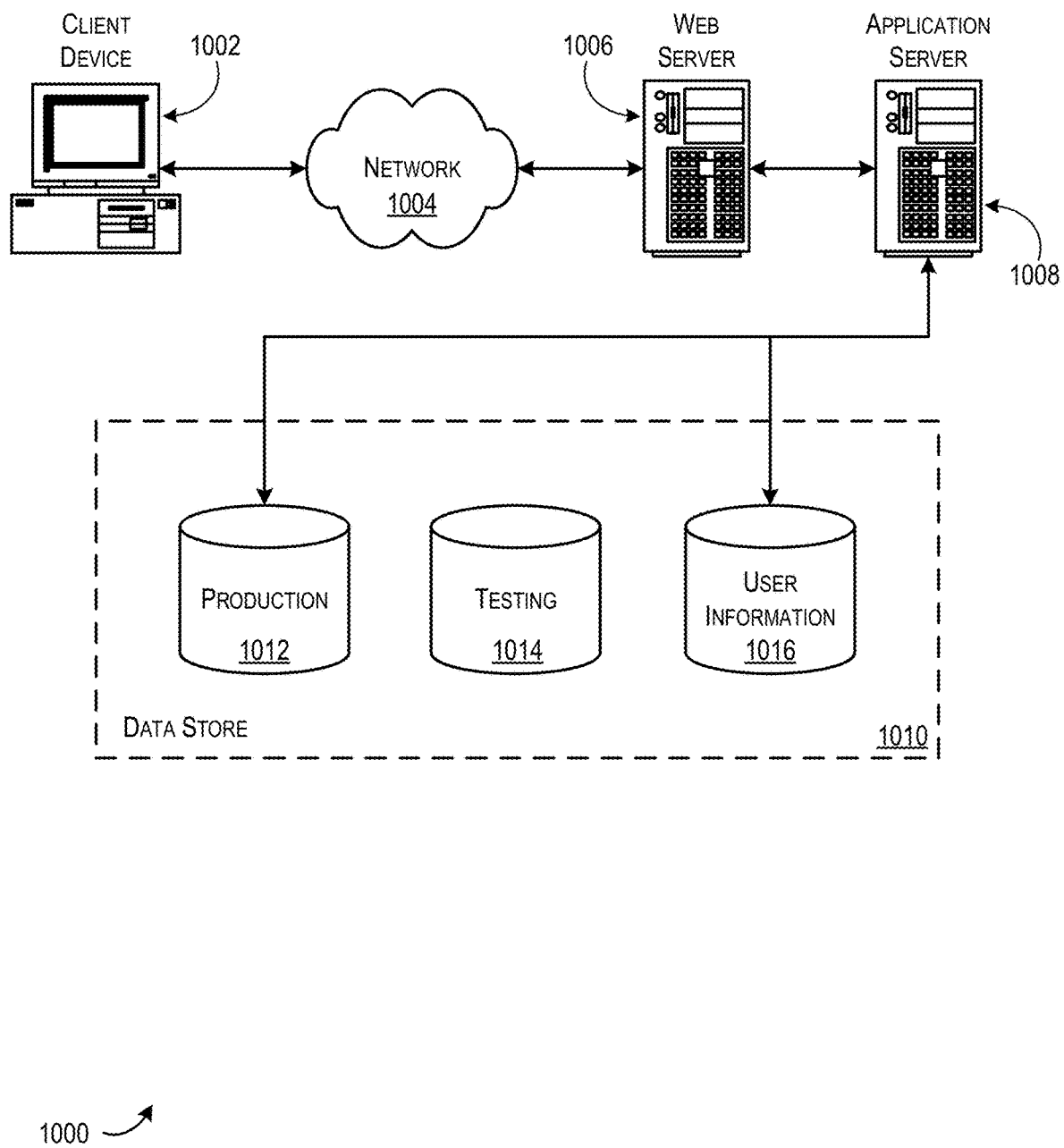
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes a user device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    training, by a computing device, one or more image impairment detection models to detect one or more corresponding image impairments of a plurality of image impairments potentially occurring in an input image, the image impairment detection models being trained based at least in part on a training set comprising a set of images associated with one or more image impairment indicators, the plurality of image impairments comprising an up-scaled image, an interlaced image, an encoding error, and a compression error;
    obtaining, by the computing device from a content provider, video content comprising a set of video frames;
    providing, by the computing device, a video frame as input to the image impairment detection models;
    detecting, by the computing device, that the video frame provided as input includes an image impairment of the plurality of image impairments based at least in part on receiving one or more outputs from the one or more image impairment detection models, the one or more outputs individually indicating that the video frame includes an image impairment artifact indicative of a particular image impairment of the plurality of image impairments; and
    executing, by the computing device, one or more operations based at least in part on the one or more outputs, wherein the one or more operations comprise at least one of i) requesting alternate video content from the content provider or ii) executing a set of operations to mitigate the effects of the image impairment artifact detected.

2. The computer-implemented method of claim 1, further comprising:

executing a conversion algorithm to convert video frame data of the video frame from a first color model to a second color model; and executing a mean-subtracted contrast normalization algorithm with the video frame data as converted, wherein the video frame provided to the image impairment detection models comprises the video frame data as converted.

3. The computer-implemented method of claim 1, wherein at least one of the image impairment detection models comprises a neural network.

4. A computing device, comprising:
one or more processors; and
a memory storing executable instructions that, when executed by the one or more processors, cause the computing device to, at least:
obtain a set of one or more image impairment detection models, each model being configured to detect a respective image impairment of a plurality of image impairments within video content provided as input, at least one image impairment model of the set of one or more image impairment detection models being previously trained utilizing a set of images associated with one or more image impairment indicators, the plurality of image impairments comprising an up-scaled image, an interlaced image, an encoding error, and a compression error;
obtain an instance of video content;
provide the instance of video content as input to the at least one image impairment detection model of the set of one or more image impairment detection models;
receive output from the at least one image impairment detection model, the output indicating that at least one impairment was detected within the instance of video content; and
perform a set of operations based at least in part on the output received.

5. The computing device of claim 4, wherein the set of operations further comprise at least one of: requesting alternate video content from a content provider of the instance of video content or executing at least one algorithm to mitigate an effect of the at least one impairment detected.

6. The computing device of claim 5, wherein the alternate video content differs from the instance of video content by video format or the alternate video content is generated utilizing different compression parameters then those used to generate the instance of video content.

7. The computing device of claim 4, wherein the output comprises a map indicating a set of pixels corresponding to the instance of video content and indicators corresponding to the set of pixels, the indicators individually indicating whether an impairment was detected with respect to a given pixel of the set of pixels.

8. The computing device of claim 7, wherein executing the instructions further cause the computing device to:
determine that the set of pixels includes a quantity of pixels; and
determine that the quantity of pixels exceeds a threshold value, wherein the set of operations performed are identified based at least in part on determining the quantity of pixels exceeds the threshold value.

9. The computing device of claim 4, wherein a first image impairment detection model of the set of one or more image impairment models takes gray scale images as input and a second image impairment detection model of the set of one or more image impairment models takes color images as input.

10. The computing device of claim 4, wherein each image impairment detection model comprises a plurality of convolutional layers.

11. The computing device of claim 4, wherein executing the instructions further cause the computing device to, prior to the instance of video content being provided as input to the at least one image impairment detection model, convert a portion of the instance of video content from a first color space to a second color space different from the first color space.

12. The computing device of claim 11, wherein converting from the first color space to the second color space separates intensity and chromatic components of the instance of video content.

13. A computer-readable storage medium having stored thereon computer-executable instructions that, when executed by a processor of a computing device, causes the computing device to perform operations comprising:
obtaining a neural network previously trained to detect an image impairment within an input image provided as input, the neural network being one of a plurality of image impairment detection models individually trained to detect one or more corresponding image impairments of a plurality of image impairments, the neural network being previously trained utilizing a set of images with corresponding indicators indicating whether a given image of the set of images includes the image impairment, the plurality of image impairments comprising an up-scaled image, an interlaced image, an encoding error, and a compression error;
obtaining an image associated with video content to be streamed to a user device;
providing the image to the neural network as input;
detecting that the image provided as input comprises the image impairment based at least in part on obtaining, from the neural network, output indicating that the image includes the image impairment the neural network was trained to detect; and
performing one or more operations based at least in part on detecting the image comprises the image impairment.

14. The computer-readable storage medium of claim 13, wherein the one or more operations comprise streaming the video content to the user device, and wherein the streaming occurs based at least in part on determining that the output indicates that the image does not include the image impairment the neural network was trained to detect.

15. The computer-readable storage medium of claim 13, wherein the operations further comprise converting the image to a four-channel image prior to providing the image to the neural network as input.

16. The computer-readable storage medium of claim 13, wherein a first set of convolutional layers of the neural network are utilized to extract image features from the image, and wherein a second set of convolutional layers of the neural network classify the image as being impaired or not impaired.

17. The computer-readable storage medium of claim 16, wherein the features include intensity and color channel data.

18. The computer-readable storage medium of claim 13, wherein the output comprises a map of pixels of the image, and wherein the computing device performs further operations comprising determining a ratio between a set of pixels that indicate existence of the image impairment the neural network was trained to detect and a total number of pixels in the image.

19. The computer-readable storage medium of claim 18, wherein the neural network comprises a dual-path network, and wherein a first path of the dual-path network corresponds to identifying features that indicate a given image includes the image impairment the neural network was trained to detect and a second path of the dual-path network corresponds to identifying features that indicate the given image lacks the image impairment the neural network was trained to detect.

\* \* \* \* \*